United States Patent
Adams et al.

(10) Patent No.: US 6,792,804 B2
(45) Date of Patent: Sep. 21, 2004

(54) SENSOR FOR MEASURING OUT-OF-PLANE ACCELERATION

(75) Inventors: Scott G. Adams, Ithaca, NY (US);
Scott A. Miller, Ithaca, NY (US);
Wendy Jo H. Johnson, Ithaca, NY (US)

(73) Assignee: Kionix, Inc., Ithaca, NY (US)

( * ) Notice: Subject to any disclaimer, the term of this patent is extended or adjusted under 35 U.S.C. 154(b) by 180 days.

(21) Appl. No.: 10/082,064

(22) Filed: Oct. 19, 2001

(65) Prior Publication Data

US 2003/0106372 A1 Jun. 12, 2003

(51) Int. Cl.[7] .......................................... G01P 15/125
(52) U.S. Cl. ................................ 73/514.32; 73/514.18
(58) Field of Search ........................ 73/514.32, 514.18, 73/514.24, 514.38, 514.16, 514.21, 514.35, 514.36; 361/280, 283.1, 283.3, 283.2

(56) References Cited

U.S. PATENT DOCUMENTS

| | | | |
|---|---|---|---|
| 4,342,227 A | 8/1982 | Petersen | 73/510 |
| 5,357,803 A | 10/1994 | Lane | 73/517 |
| 5,488,864 A | 2/1996 | Stephan | 73/514.32 |
| 5,550,090 A | 8/1996 | Ristic | 437/228 |
| 5,610,335 A | 3/1997 | Shaw | 73/514.36 |
| 5,756,901 A * | 5/1998 | Kurle et al. | 73/777 |
| 5,814,727 A | 9/1998 | Matsuda | 73/514.17 |
| 5,846,849 A | 12/1998 | Shaw | 438/52 |
| 5,847,280 A * | 12/1998 | Sherman et al. | 73/514.32 |
| 5,900,550 A | 5/1999 | Menzel | 73/514.32 |
| 5,914,553 A | 6/1999 | Adams et al. | 310/309 |
| 5,959,208 A * | 9/1999 | Muenzel et al. | 73/514.32 |
| 6,000,280 A | 12/1999 | Miller | 73/105 |
| 6,023,972 A | 2/2000 | Hulsing, II | 73/504.04 |
| 6,035,714 A | 3/2000 | Yazdi | 73/514.32 |
| 6,066,265 A | 5/2000 | Galvin | 216/2 |
| 6,084,257 A | 7/2000 | Petersen et al. | 257/254 |
| 6,104,073 A | 8/2000 | Ferrari | 257/417 |
| 6,105,427 A | 8/2000 | Stewart | 73/514.32 |
| 6,109,106 A | 8/2000 | Ferrari et al. | 73/514.32 |
| 6,122,963 A | 9/2000 | Hammond | 73/514.32 |
| 6,148,670 A | 11/2000 | Judy | 73/514.32 |
| 6,149,190 A | 11/2000 | Galvin | 280/735 |
| 6,182,509 B1 | 2/2001 | Leung | 73/514.05 |
| 6,192,757 B1 | 2/2001 | Tsang | 73/514.32 |
| 6,196,067 B1 | 3/2001 | Martin | 73/514.32 |
| 6,215,645 B1 | 4/2001 | Li | 361/283.3 |
| 6,225,668 B1 | 5/2001 | Shindo | 257/368 |

* cited by examiner

*Primary Examiner*—Helen Kwok
(74) *Attorney, Agent, or Firm*—Jones, Tullar & Cooper PC

(57) ABSTRACT

An accelerometer. A silicon wafer is etched to form a fixed portion, a movable portion, and a resilient coupling between, the fixed and movable portions generally arranged in the plane of the wafer, the mass of the movable portion being concentrated on one side of the resilient coupling. One of the fixed and moveable portions of the silicon structure includes a first electrode. The other of the fixed and moveable portions includes a second electrode oriented parallel to the axis of acceleration, and an electrically-conductive layer electrically connected as a third electrode coplanar and mechanically coupled with the second electrode. The second and third electrodes are arranged in capacitive opposition to the first electrode, the capacitance between the first electrode and third electrode increasing as the movable portion moves in a direction along the axis of acceleration relative to the fixed portion and decreasing as the movable portion moves in an opposite direction. A resilient coupling retains the first and third electrodes in capacitive opposition to each other across a capacitance gap while allowing motion of the first electrode relative to the second and third electrodes in response to acceleration along an axis of acceleration perpendicular to the plane of the wafer, and resiliently restores the first electrode to an equilibrium position when the acceleration ceases. The second electrode is in opposition to a majority of the surface area of the first electrode when the electrodes are in the equilibrium position. Capacitance between the first and third electrodes is measured to obtain a measurement of acceleration along the axis.

64 Claims, 8 Drawing Sheets

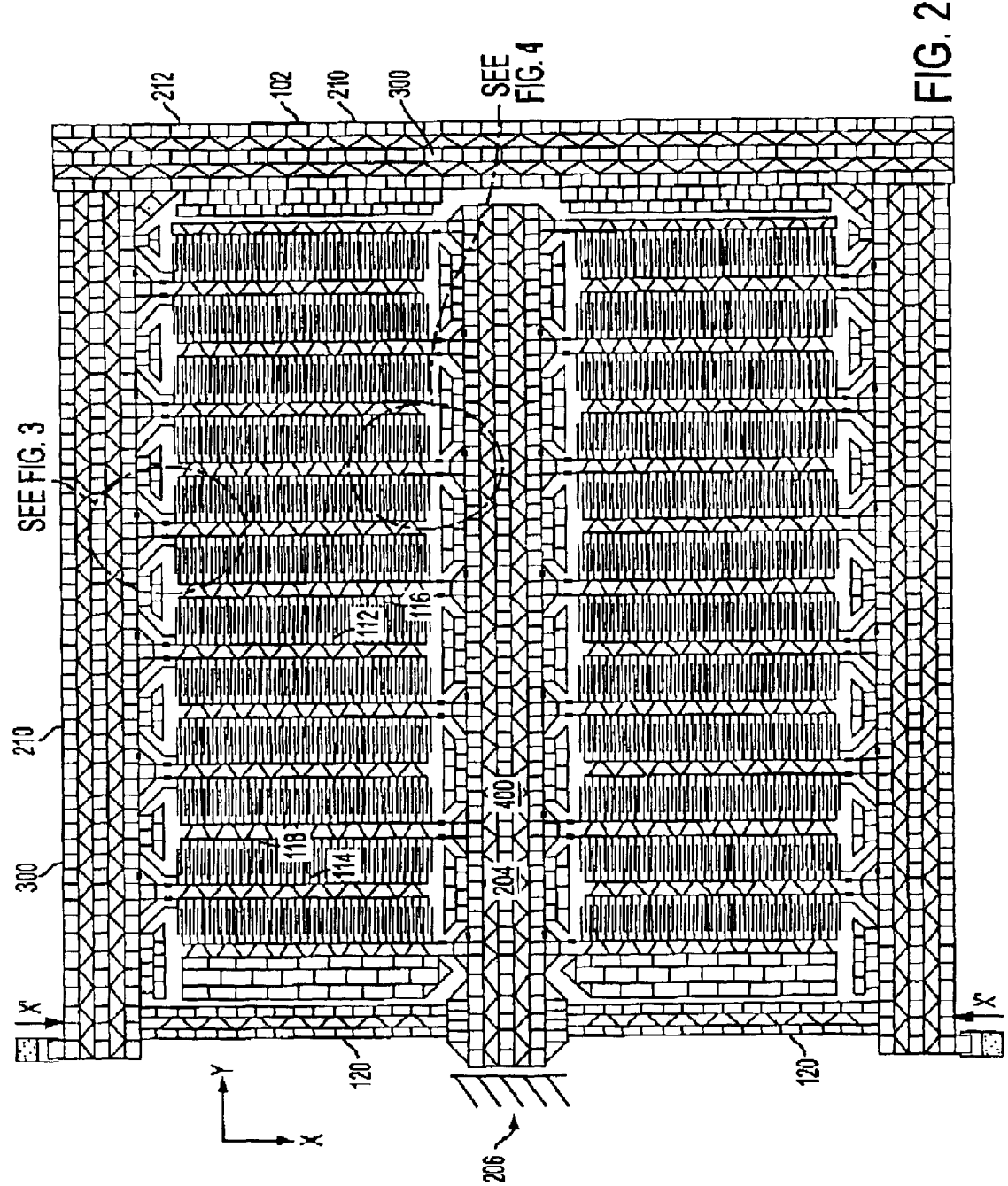

SENSOR FOR MEASURING OUT-OF-PLANE ACCELERATION

BACKGROUND

The invention relates to accelerometers.

Accelerometers are devices that measure acceleration, or changes in a rate of motion. When an elevator starts or stops, several portions of the human body can detect the change in motion and report the change to the brain. Similarly, known accelerometers use different mechanical and electrical techniques to detect changes in motion, and to report the changes to processors. Accelerometers are used in navigational systems, automatic seat belt and air bag triggers, and many other applications.

In known techniques for manufacturing semiconductors, a single crystal of silicon is grown, and then photographic and lithographic techniques are used to etch away unwanted parts of the silicon, and to introduce doping atoms into the silicon to change the electrical properties of the silicon. It is also known to deposit other materials onto the silicon—for example, thin layers of metal may be deposited onto the silicon to serve as conducting wires between different portions of a circuit. The underlying silicon serves as a structural base to provide mechanical support for the metal, while the metal provides the electrical conductivity.

SUMMARY

In general, in a first aspect, the invention features an accelerometer. The accelerometer includes a fixed structure, a movable structure, and a resilient coupling. The fixed and movable structures generally lie in a plane. The fixed structure bears a fixed electrode, and the movable structure bears a movable electrode. The resilient coupling is designed to retain the fixed and movable structures in capacitive opposition to each other across a capacitance gap while allowing motion of the movable electrode relative to the fixed electrode in response to acceleration along an axis of acceleration perpendicular to the plane, and to resiliently restore the two electrodes to an equilibrium position when the acceleration ceases. Electronics and/or software is designed to translate a measurement of capacitance between the fixed and movable electrodes into a measurement of the acceleration along the axis.

In general, in a second aspect, the invention features an accelerometer. The accelerometer includes a fixed portion, a movable portion, and a resilient coupling. The fixed and movable portions generally lie in a plane. The resilient coupling is designed to allow motion of the movable portion relative to the fixed portion in response to acceleration along an axis of acceleration perpendicular to the plane and to resiliently restore the two portions to an equilibrium position when the acceleration ceases. One of the fixed and moveable portions of the silicon structure is electrically connected as a first electrode. The other of the fixed and moveable portions bears an electrically-conductive layer electrically connected as a second electrode. The first and second electrodes are arranged in capacitive opposition to each other. Electronics and/or software are designed to translate a measurement of capacitance between the first and second electrodes into a measurement of acceleration along the axis.

In general, in a third aspect, the invention features an accelerometer. A silicon wafer is etched to form a fixed portion, a movable portion, and a resilient coupling between. The fixed and movable portions generally lie in a plane. The resilient coupling is designed to allow motion of movable portion relative to the fixed portion perpendicular to the wafer in response to acceleration perpendicular to the wafer and to resiliently restore the two portions to an equilibrium position when the acceleration ceases. The mass of the movable portion is concentrated on one side of the resilient coupling. The fixed and moveable portions each bear an electrode, the electrodes being arranged in capacitive opposition. Electronics and/or software are designed to translate a measurement of capacitance between the first and second electrodes into a measurement of acceleration perpendicular to the wafer.

In general, in a fourth aspect, the invention features an accelerometer. A first electrode is oriented parallel to an axis of acceleration. A second electrode is oriented parallel to the axis of acceleration. A third electrode is coplanar with the second electrode. The second and third electrodes are arranged in capacitive opposition to the first electrode. A resilient coupling is designed to allow motion of the first electrode relative to the second and third electrodes along the axis of acceleration in response to acceleration and to resiliently restore the first electrode to an equilibrium position when the acceleration ceases. The second electrode is in opposition to a majority of the surface area of the first electrode when the electrodes are in the equilibrium position. Electronics and/or software are designed to translate a measurement of capacitance between the first and third electrodes into a measurement of acceleration along the axis.

Embodiments of the invention may include one or more of the following features. The fixed structure, movable structure and resilient coupling may be integrally formed primarily by etching a silicon wafer. The fixed structure and movable structure may be formed at least primarily of high aspect ratio beams. The third electrode may be connected to a ground potential. The first electrode may be formed as a high-aspect-ratio beam with a larger cross-sectional dimension oriented parallel to the axis of acceleration. Various structures of the movable and fixed structures may be electrically isolated from each other by isolation joints formed within the silicon wafer. Various structures etched from the wafer may be released from an underlying substrate of the silicon wafer. The electronics and/or software may measure differential capacitance between at least two pairs of electrodes, and translate the measured differential capacitance into an expression of acceleration. A capacitance between the fixed and movable electrode may be at a maximum when the movable structure is displaced from the equilibrium position. The resilient coupling may be a torsional flexure. The fixed and movable electrodes may be arranged in first and second regions, such that (a) motion in a direction of the movable structure results in increased capacitance between electrodes in the first region and decreased capacitance in the second region; and (b) motion in an opposite direction of the movable structure results in decreased capacitance between electrodes in the first region and increased capacitance in the second region. The axis of acceleration may be perpendicular to the wafer. The metal electrode may be formed as a layer deposited on the silicon of the movable portion. The movable portion may include a stop designed to engage a floor of the fixed portion to limit excess motion. The second silicon electrode may be in opposition to a majority of the surface area of the first silicon electrode when the electrodes are in the equilibrium position.

The above advantages and features are of representative embodiments only. It should be understood that they are not to be considered limitations on the invention as defined by the claims. Additional features and advantages of the invention will become apparent in the following description, from the drawings, and from the claims.

DESCRIPTION OF THE DRAWING

FIG. 2 is a plan view of an accelerometer.

FIGS. 5b and 5c are details of FIG. 5a.

DESCRIPTION

I. Overview

Figure 1A:
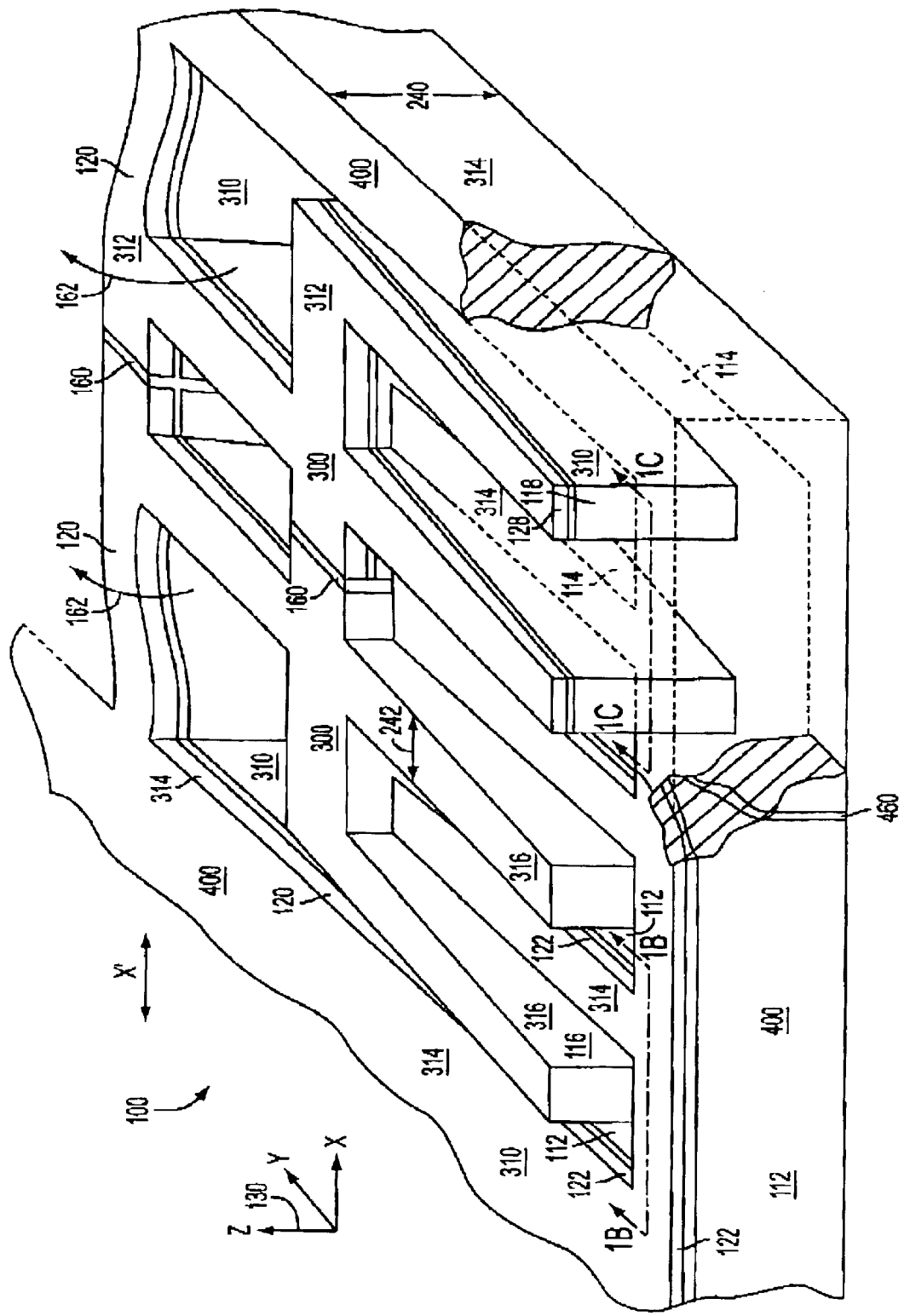
FIG. 1a is a perspective view, partially cut away, of an accelerometer.
Figure 1B:
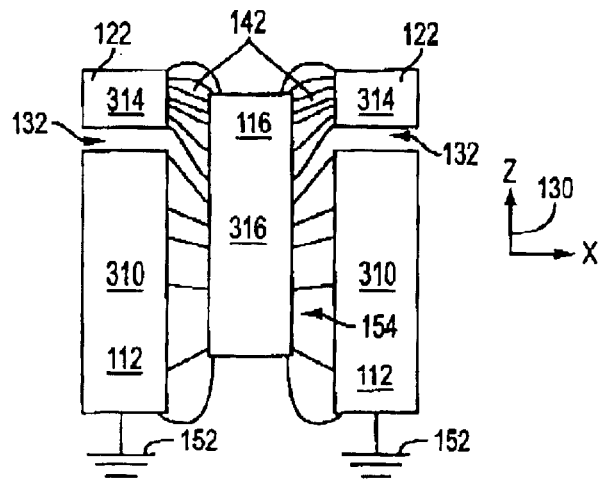
FIGS. 1b, 1c, 1d, 1e, 1f and 1g are end views of an accelerometer.
Figure 1C:
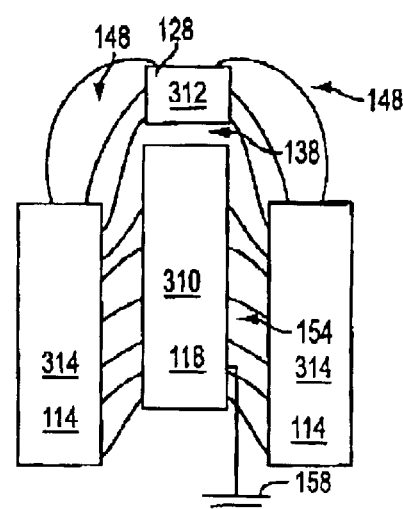
Figure 1D:
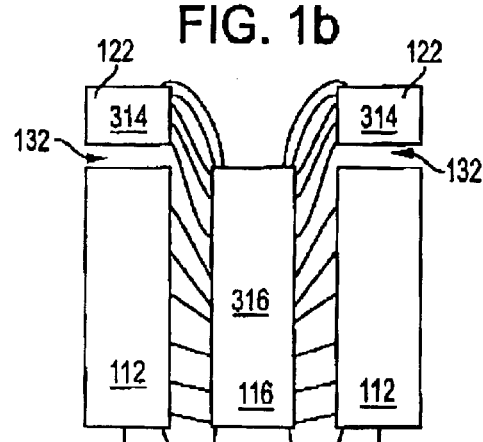
Figure 1E:
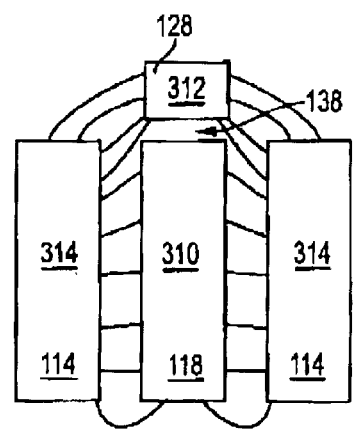
Figure 1F:
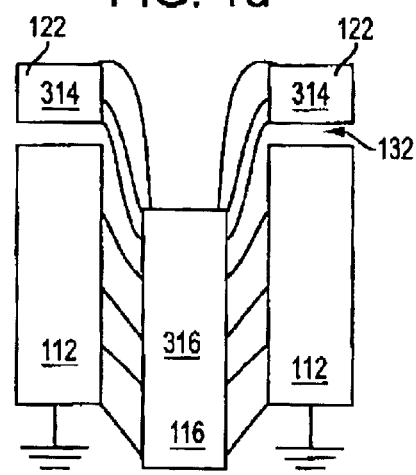

Referring to FIGS. 1a–1g, accelerometer 100 may be etched as a solid state structure, for instance, out of a block of silicon. Accelerometer 100 may include a movable portion 300 and a fixed portion 400, each including a plurality of electrodes 112, 114, 116, 118, 122, 128 generally formed as high-aspect-ratio beams or capacitor plates, each oriented in planes perpendicular to the silicon wafer and parallel to the z-axis 130 of the wafer along which acceleration is to be measured. Electrodes 112, 114, 122 of fixed portion 400 may be interdigitated between electrodes 116, 118, 128 of movable portion 300, with capacitance gaps 142, 148 between. Resilient mounting 120 holds movable portion 300 in an equilibrium rest position relative to fixed portion 400 (as shown in FIGS. 1d and 1e), and allows motion of movable portion 300 relative to fixed portion 400 along z-axis 130 in response to acceleration (as shown in FIGS. 1a, 1b, 1c, 1f and 1g). As movable electrodes 116, 118, 128 move relative to the fixed electrodes 112, 114, 122, some of the opposed pairs of electrodes come into more-direct opposition to each other (that is, as the surface area of movable electrode 116 comes to be more directly opposed to fixed electrode 112, 122, and movable electrode 118, 128 comes to be more directly opposed to fixed electrode 114), and the capacitance increases. Other pairs of opposed electrodes move out of opposition to each other, and the capacitance between these pairs decreases. These changes in capacitance can be measured, giving a measure of the displacement of movable portion 300 relative to fixed portion 400, and thus a measure of the acceleration imposed on the accelerometer 100 as a whole.

At least some of the capacitor fingers may be divided into two separate conductors (e.g., 112, 122 and 118, 128), with an insulating layer 132, 138 separating the two conductors of a single finger. For instance, electrodes 112, 114, 116, 118 may be formed in silicon layers (typically doped to improve conductivity), and electrodes 122, 128 may be formed in a metal layer laid atop the silicon structural members. Capacitance 142, 148 may be measured between pairs of electrodes (122, 116 and 114, 128) that are not directly opposed to each other when the accelerometer is in its equilibrium state. Capacitance 142, 148 may be measured between electrodes of different materials—for instance, capacitance may be measured between metal electrodes 122, 128 and silicon electrodes 114, 116. Some electrodes 112, 118 may be grounded 152, 158, or otherwise electrically connected to consume field lines 154, 156, to reduce the total capacitance 142, 148 between electrodes 114, 116, 122, 128.

To a first-order approximation, the capacitance 142, 148 between metal electrodes 122, 128 and their opposed silicon electrodes 114, 116 is at a maximum when the metal electrode 122, 128 is most nearly centered on the face of the opposing silicon electrode 114, 116, because of the shapes of the fringing fields around the electrodes. (Because of the field lines that terminate in the grounded electrodes 112, 118, the maximal capacitance is actually achieved when the metal electrode 122, 128 is somewhat below the mid-point of the opposing silicon electrode 114, 116.) Thus, capacitance 142 between electrodes 116 and 122 increases as movable portion 300 moves up within fixed portion 400 (the motion depicted in moving from FIG. 1d to FIG. 1b), and capacitance 148 between electrodes 114 and 128 decreases as metal electrode 128 moves out from between electrodes 114 (the motion depicted in moving from FIG. 1e to FIG. 1c). Similarly, capacitance 142 between electrodes 116 and 122 falls as movable portion 300, carrying silicon electrode 116, moves down between electrodes 122 (the motion depicted in moving from FIG. 1d to FIG. 1f), and the capacitance 148 between electrodes 114 and 128 increases (the motion depicted in moving from FIG. 1e to FIG. 1g).

Electronics may measure differential capacitance. For instance, because the 114-to-128 capacitance 148 and the 116-to-122 capacitance 142 change in opposite directions with motion, and electronics (discussed in section II.E, infra) may measure the 114-to-128 capacitance 148 less the 116-to-122 capacitance 142. That difference will generally reflect the degree of deflection of movable portion 300. From that difference, electronics may determine the amount of acceleration imposed on accelerometer 100.

Figure 1G:
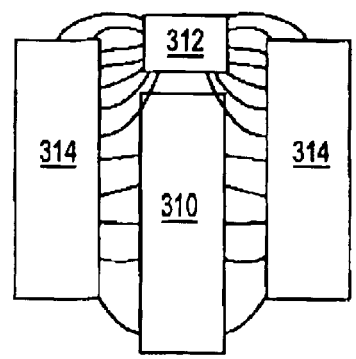

Isolation joint 160 electrically isolates electrodes 116 on the left half of FIG. 1a (and FIGS. 1b, 1d, and 1f) from the electrodes 118, 128 on the right half of FIG. 1a (and FIGS. 1c, 1e and 1g).

Resilient mounting 120 may be a torsional flexure, or a beam that acts in torsion, that provides for movement of movable portion 300 through torsional rotation (arrows 162). Various portions of resilient mounting 120 may also serve as conductors to drive electrodes 112, 114, 116, 118, 122, 128.

II. Structure

A. Major Structural Elements

Referring to FIG. 2, accelerometer 100 may include a center backbone 204, movable outer frame 210, electrodes 112, 114, 116, 118 mounted to center backbone 204 and outer frame 210, and torsional flexure 120. Center backbone 204 and fixed electrodes 112, 114 may be anchored to the silicon wafer to form fixed portion 400. Resilient torsional flexure 120 may be anchored to the wafer at anchor point 206 and may be otherwise released from the floor of the wafer (by undercutting, as described below in connection with FIGS. 6c and 6g). Outer frame 210 may carry movable electrodes 116, 118, to form movable portion 300. Outer frame 210 and movable electrodes 116, 118 are released from the floor of the wafer, so that motion tends to be greatest at the right-most end 212 of movable portion 300. Center backbone 204, outer frame 210 and torsional flexure 120 may all be formed from truss-structured silicon members. The walls of torsional flexure 120 may be thinner than the walls of center backbone 204 or outer frame 210 in order to increase flexibility of torsional flexure 120.

Anchor point 206 may be relatively small, to provide strain relief, or to allow movable portion 300 and fixed portion 400 to curl together in a common mode of deformation when the manufacturing process or temperature variations cause curling or bending. In other embodiments, anchor point 206 may extend farther along the edge of torsional flexure 120, to provide rotational stability for movable portion 300 about z-axis 130 (FIG. 1a). Torsional flexure 120 may be compliant, primarily in torsion, permitting rotation of movable portion 300 about axis x'. The rotation angle may typically be less than 0.04 degrees; therefore, the motion of movable portion 300 may be predominantly along z-axis 130 and proportional to the distance from the torsional flexure 120. Maximum deflection of movable portion 300 relative to fixed portion 400 along the z-axis 130 perpendicular to the wafer may be on the order of tens to hundreds of nanometers. Off-axis motion (within the plane of the wafer) may be confined to an order of magnitude less, by designing appropriate stiffening truss structures into movable portion 300 and fixed portion 400.

The overall size of accelerometer 100 may be about 1 mm×1.5 mm. The mass of the movable structure may be about $10^{-8}$ kg. The inertial moment of movable portion 300 around torsional flexure 120 may be about 5 to $6\times10^{-8}$ kg $m^2$.

The resonant frequency of movable portion 300 within fixed portion 400, moving in the z-axis direction 130, may be about 1.3 to 1.4 kHz, and is desirably about 1 kHz for sensing accelerations in the 1 to 10 g range. For higher g accelerometers or higher frequency response, higher resonances are generally preferred and can be accommodated through stiffer torsional flexures 120. Movable portion 300 may move relative to fixed portion 400 in other vibrational modes, for instance, rotating around the z-axis 130, or rotating side-to-side around the y-axis (where the left half of FIG. 1a rotates up and the right half down, for instance). In an ideal accelerometer, movable portion 300 would only move only in the z-axis direction, giving a finite resonance frequency for resonance in the z-axis direction, and would resist motion in all other directions, giving an infinite resonance frequency for all other vibrational modes. Thus, higher resonant frequencies are generally preferable for these off-axis motions, and resonant frequencies of between 5 and 10 kHz may be achieved in actual devices. For a given amount of acceleration along z-axis 130, fixed portion 400 may deflect by about 1/29 of the amount of deflection of movable portion 300. Generally, smaller ratios of deflection are better than larger, to the degree permitted by other engineering constraints.

Referring again to FIG. 1a, typically, the silicon structures may be 20 to 40 microns high (dimension 240). The silicon elements may typically be 2 microns wide (dimension 242).

Figure 3:
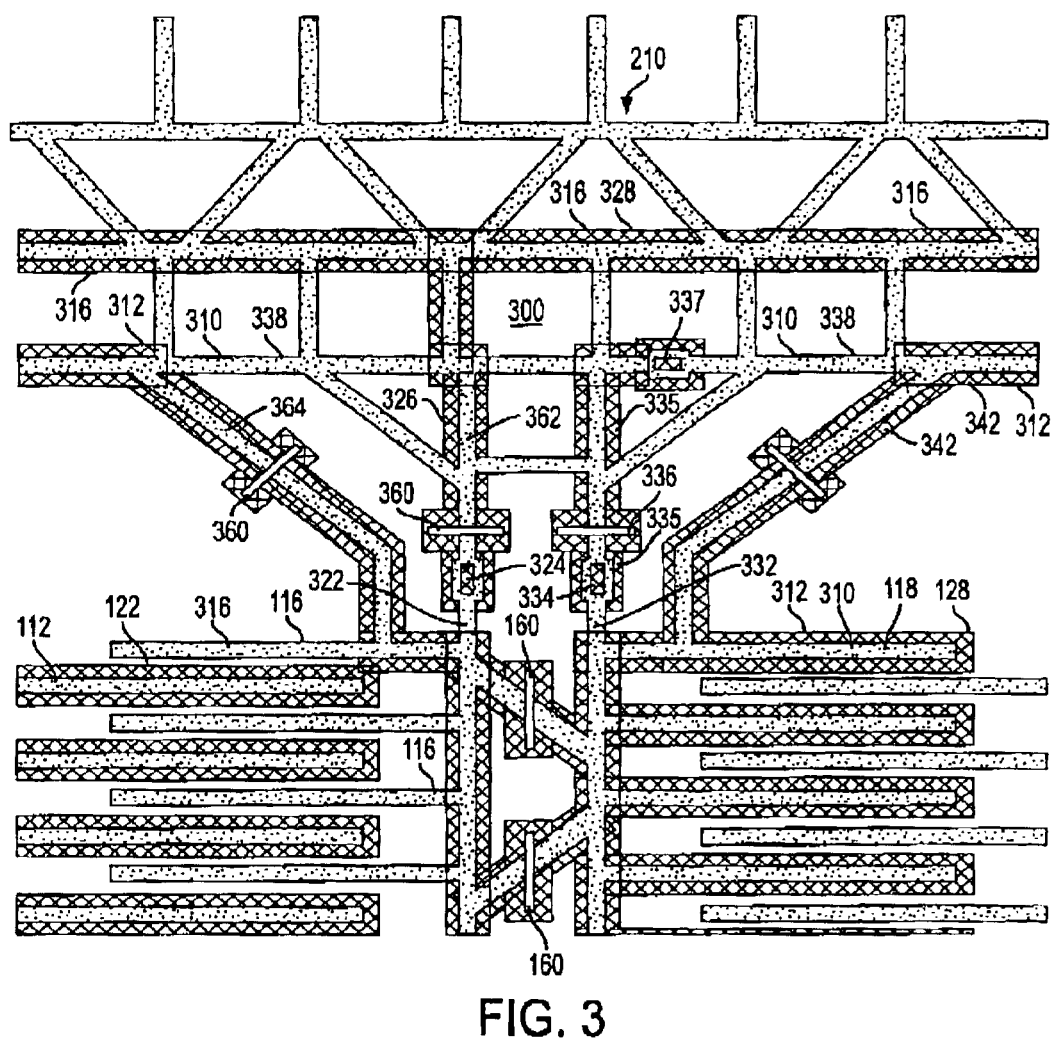
FIGS. 3 and 4 are plan views of details of an accelerometer.
Figure 4:
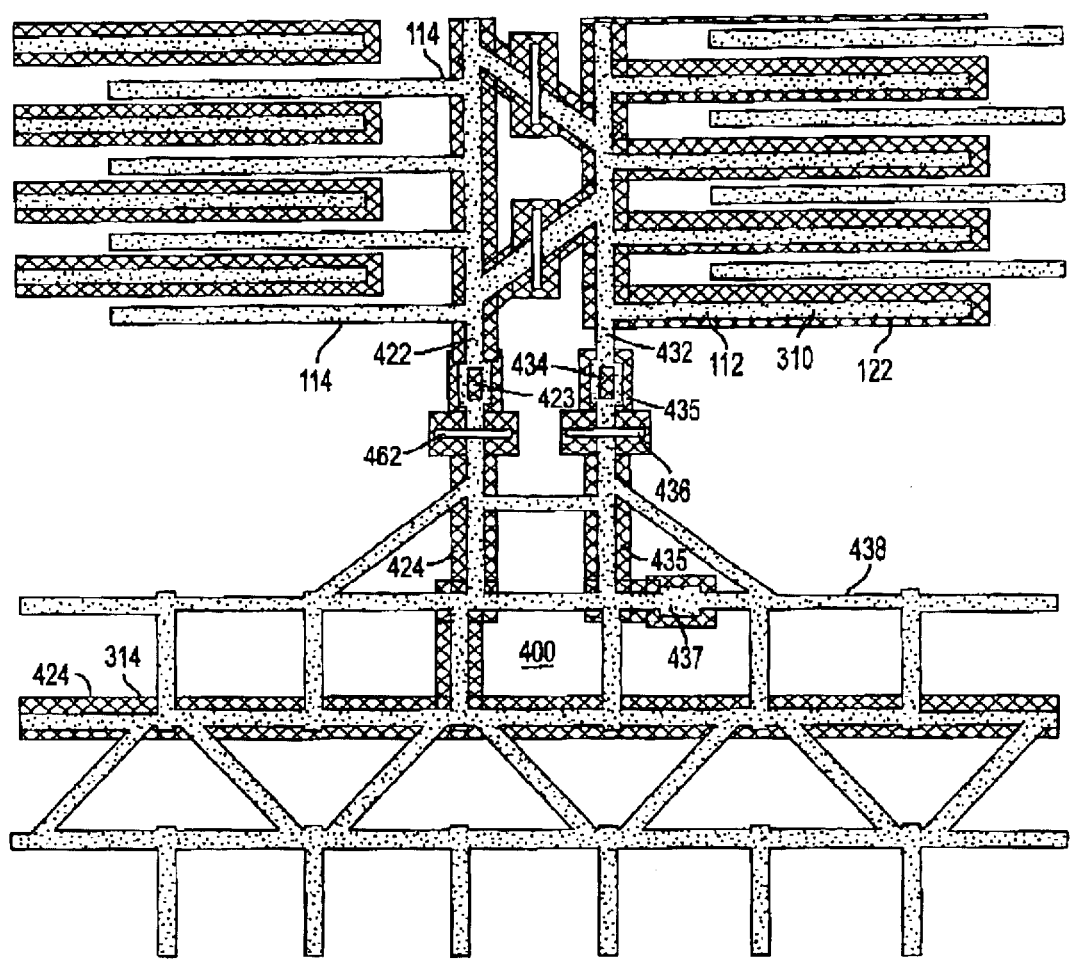

Referring to FIGS. 3 and 4, movable portion 300 and fixed portion 400 may include repeated patterns of silicon and metal structures. Two important patterns are shown in FIG. 3 and FIG. 4. The primary structure of movable portion 300 and fixed portion 400 may be formed of silicon beams 112, 114, 116, 118, 332, 338, 362, 364, 432, 438. These beams may be etched from a single-crystal silicon wafer. Before the silicon is etched, the top surface of the silicon may be oxidized to form an insulating layer of silicon dioxide of 0.5 to 1 microns, and metal may be laid on top of the silicon in the pattern shown in stipple. When the silicon wafer is etched to form the physical structure, metal overlaying the etched portions of the silicon may be removed as well, so that the metal remains only atop the silicon beams. Isolation joints 160, 360, 336, 436, 462 electrically isolate different portions of the silicon structure from each other. Vias 324, 334, 337, 423, 434, 437 connect the metal layer through the insulating oxide to the underlying silicon.

B. Movable Portion

Four voltage potentials (which will be designated potentials 310, 312, 314 and 316) may be applied to the various components. Capacitances (including changes in capacitance, differential capacitance, or changes in differential capacitance) between pairs of these potentials may then be measured to determine acceleration.

Referring to FIG. 3, in conjunction with the left half of FIG. 1a, and FIGS. 1b, 1d and 1f, potential 316 may be applied to silicon electrode 116. Electrode 116 may be electrically contiguous with silicon beam 322. Beam 322 may be electrically connected through via 324 to metal 326. Metal 326, 328 may connect drive and measurement electronics (see discussion in section II.E, infra) to apply potential 316 to silicon electrode 116. Because silicon electrode 112 and metal electrode 122 are part of fixed portion 400, detailed discussion will be deferred until section II.C, infra, and discussion of FIG. 4. The gap between fingers 112, 116 and 114, 118 may be about 3 microns.

Referring to FIG. 3, in conjunction with the right half of FIG. 1a, and FIGS. 1c, 1e and 1g, ground potential 310 may be applied to silicon electrode 118. Electrode 118 may be electrically contiguous with silicon beam 332. Silicon beam may connect through via 334 to metal 335, which crosses isolation joint 336, and reconnects to silicon beam 338 through via 337. (Vias 334, 337, isolation joint 336 and metal 335 may not be required by electrical considerations; via 334 and isolation joint 336 may serve to improve the match between the thermal expansion of leg 332 and the thermal expansion of leg 322.) Drive and measurement electronics may apply ground potential 310 to silicon beam 338. Metal electrode 128 may be connected through metal 342 to drive and measurement electronics, which may drive metal electrode 128 at potential 312. Because silicon electrode 114 may be part of fixed portion 400, detailed discussion will be deferred until section II.C and discussion of FIG. 4.

Isolation joints 160, 360 may electrically isolate portions of the silicon from each other. For instance, isolation joints 160 may isolate electrodes 116 (electrical potential 316) on the left half of FIG. 3 from electrodes 118 (ground potential 310) on the right half of FIG. 3. Isolation joints 360 may isolate electrodes 116 (electrical potential 316) from silicon beams 338 (ground potential 310). Isolation joints 160, 360 may be formed as follows. Slits or trenches may be etched into the wafer, in the locations that become isolation joints 160, 360. During the same thermal oxidation process that forms the oxide layer on top of the entire wafer to insulate metal layer 122, 128 from the underlying silicon, silicon dioxide may be grow on the wafer to fill in the trenches. This growth may cause the two opposing faces of silicon dioxide to fuse to each other. Further, the growth of silicon dioxide around the circular ends of the trenches may provide a connection across the two sides of the isolation joint. Together, the fusing of opposing faces and growth across the ends of the trenches may provide sufficient structural integrity to provide mechanical support for electrodes 116, 118 on silicon beams 362, 364.

Metal laid across the tops of isolation joints 160, 360 is electrically insulated from the silicon on both sides of the isolation joint, but is electronically continuous across the top of the isolation joints.

Conducting vias 324, 334, 337, 423, 434, 437, etc. may be formed in the conventional manner. In FIG. 3, they are shown as slightly wider beam region than the silicon beam regions immediately adjacent. Beams may be widened where vias are placed in order to keep the vias interior to the beam geometry.

C. Fixed Portion

Referring to FIG. 4, in conjunction with the right half of FIG. 1a, and FIGS. 1c, 1e and 1g, potential 314 may be applied to silicon electrode 114. Electrode 114 may be connected through beam 422 through via 423 to metal 424, which may run over isolation joint 462 out to the edges of the device. Drive and measurement electronics may apply potential 314 to metal 424.

Referring to FIG. 4, in conjunction with the left half of FIG. 1a, and FIGS. 1b, 1d and 1f, ground potential 310 may be applied to silicon electrode 112. Electrode 112 may be electrically contiguous with silicon beam 432. Beam 432 may connect through via 434 to metal 435. Metal 435 may cross isolation joint 436, to via 437, which may in turn connect metal 435 to silicon beam 438. Drive and measurement electronics may apply ground potential 310 to beam 438. (Vias 434, 437, isolation joint 436 and metal 435 may not be required by electrical considerations; via 434 and isolation joint 436 may improve the match between thermal expansion of leg 432 and thermal expansion of leg 422.) Metal electrode 122 may be electrically connected to metal 424 across isolation joints 460. Potential 314 may be applied to metal 424 as discussed above.

Isolation joint 460 separates silicon electrode 112 from silicon electrode 114.

D. Mechanical Stops

Figure 5A:
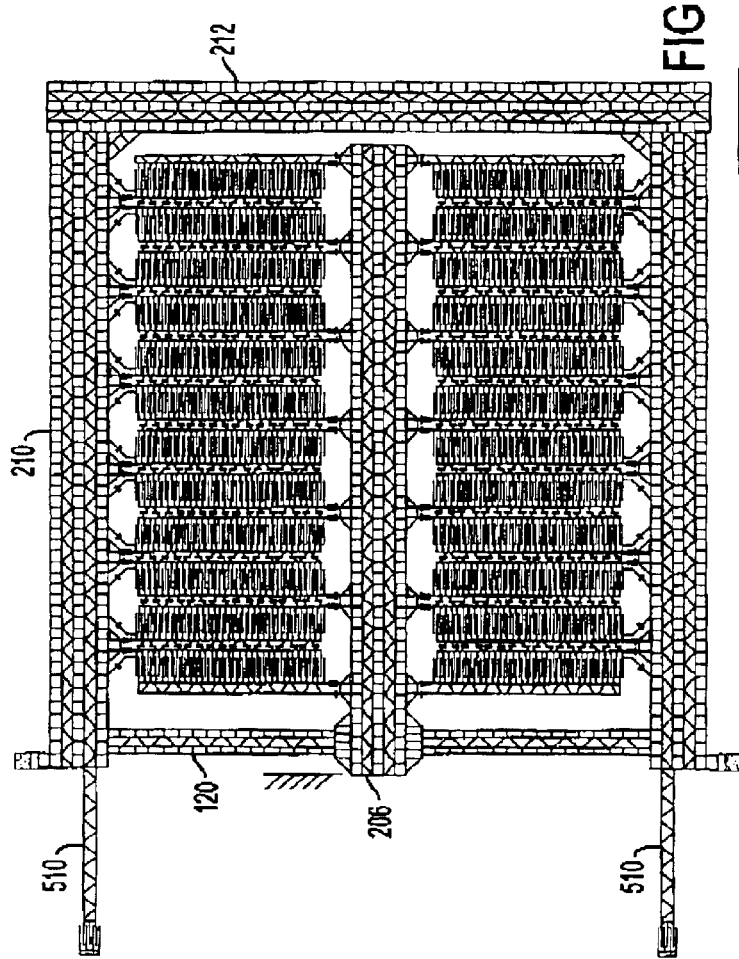
FIG. 5a is a plan view of an accelerometer.
Figure 5C:
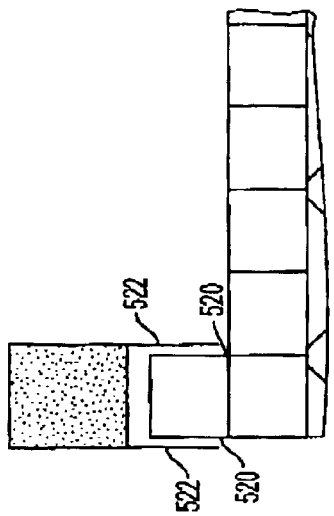
Figure 5B:
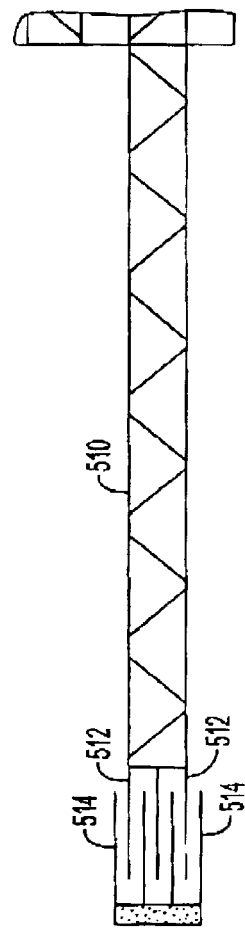

Referring to FIGS. 5a and 5b, recall that movable portion 300 may be held by anchor 206 about 10 microns above a "floor" of the silicon substrate that remains after the etching process. Downward motion of movable portion 300 may be contained when the right edge 212 of frame 210 reaches this floor. Excessive upward movement of movable portion 300 may be contained by a stop 510 that extends in the opposite direction from the capacitive fingers of movable portion 300, so that as movable portion 300 moves up, stop 510 moves down until it makes contact with the substrate floor. The length of stop 510 may be anywhere from one-fourth as long as the distance from anchor 206 to right edge 212 (allowing movable portion to move up four times as far as it can move down), to essentially the same length as the distance from anchor 206 to edge 212 (confining both ranges of motion roughly equally). It may be desirable that stop 510 have a low moment of inertia around anchor 206, to reduce the attenuation of response of movable portion 300 in response to acceleration.

Stop 510 may end with fingers 512 that are interdigitated with fingers 514 mounted on fixed portion 400. Similarly, stops 520 mounted on movable portion 300 may be interdigitated with fingers 522 mounted on fixed portion 400. Stops 512, 520 constrain rotation and translation of movable portion 300 in the plane of the wafer.

E. Drive and Measurement Electronics

An accelerometer as described above may have a sensitivity in the range of 10 to 15 fF/g (femtofarads per g of acceleration).

As discussed in section 1, supra, accelerometer 100 may use a differential capacitor approach. In a differential capacitor arrangement, for an acceleration in one direction, capacitance increases between one pair of electrodes, and capacitance decreases between the other pair. For acceleration in the opposite direction, the changes in capacitance are reversed. Thus, the difference between the capacitances indicates the amount of acceleration. An ASIC (application-specific integrated circuit) converts the capacitance difference into a voltage that represents acceleration.

In one design, the ASIC places equal but opposite square wave voltages across the two capacitors and integrates the difference of the capacitor currents. The output of the integrator will be a voltage that is proportional to the difference in capacitance. This voltage is then amplified and low pass filtered to give the desired sensitivity and frequency response. A programmable voltage can be added or subtracted from this signal to provide for an offset adjustment. Additionally the gain of the capacitance-to-voltage conversion can be programmed to account for sensor performance distributions and different sensor designs.

Just as an electrical generator can function as a motor if the proper electrical current is applied to the generator outputs, so voltages can be applied to conductors 310, 312, 314 and 316 of accelerometer, to cause movable portion 300 to move relative to fixed portion 400. By altering the carrier signals used to sense the capacitance difference it is possible to implement a self-test mechanism. In self-test mode, electrical signals 310, 312, 314 and 316 are driven so that movable portion 300 is displaced, to verify that the movable structure 300 can move and that the appropriate capacitance change results. An electrical force is always generated by voltages such as the carrier signals for sensing. However, under normal operation the carrier signals are balanced and no net force arises. By altering the carrier signals such that the RMS voltages are not the same on the two sides of the differential capacitor used for sensing, a net force results. The net force causes a relative motion between the fixed portion 400 and movable portion 300. This is a standard self-test method used in most commercial accelerometer ASIC's.

ASIC's operating under this principle, as well as other techniques for translating a capacitance change into a voltage representing acceleration, are available from a number of universities and companies, including Kionix, Inc., Bosch GmbH, and MicroSensors, Inc. of Costa Mea, Calif.

III. Fabrication

The overall silicon structure may be manufactured using silicon fabrication technologies available from Kionix, Inc. of Ithaca, N.Y. This is a mature process that is well suited to mass production. The Kionix process is an all-dry process, and lithography steps are carried out on planar surfaces.

Figure 6A:
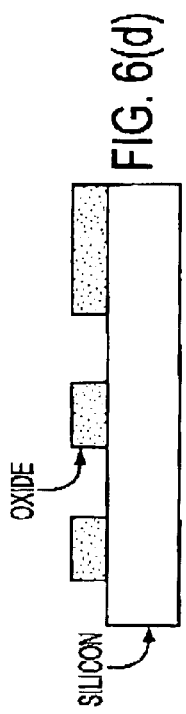
FIGS. 6a, 6b, 6c, 6d, 6e, 6f and 6g are diagrammatic views of steps in fabricating an accelerometer.
Figure 6B:
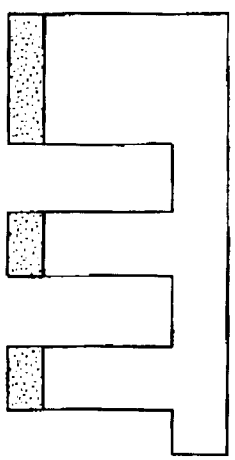

Referring to FIGS. 6a–6g, accelerometer 100 may be fabricated using a plasma micromachining process. One such plasma micromachining process may use four masks and industry-standard silicon wafers. The first mask may define trenches that are etched into the silicon to form isolation joints. As shown in FIG. 6a, these trenches may be filled with silicon dioxide 612. Using the second mask, vias 620 may be defined and opened in field. Implants 622 may be made and aluminum 624 may be deposited. As shown in FIG. 6b, using the third mask, metal 624 may be patterned to break electrical connections where necessary. The fourth and final mask may be used to define the structural beams. The profile of the structural beams may etched into the silicon using a production ICP silicon etcher, for example, a PlasmaTherm VLR 770 with ICP Bosch Etch & ICP Oxide Etch Chambers, resulting in the structures shown in FIG. 6e. The sidewalls may be passivated 630 with a deposited layer of silicon dioxide. The oxide on the trench bottoms that surround the beams may be cleared using an anisotropic silicon dioxide etch, while the sidewall passivation 630 remains, yielding the configuration of FIG. 6f.

Figure 6C:
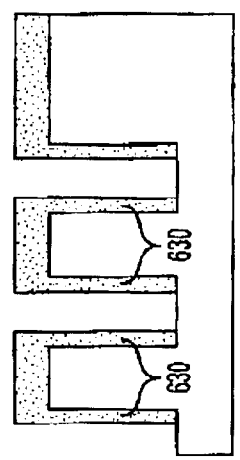
Figure 6D:
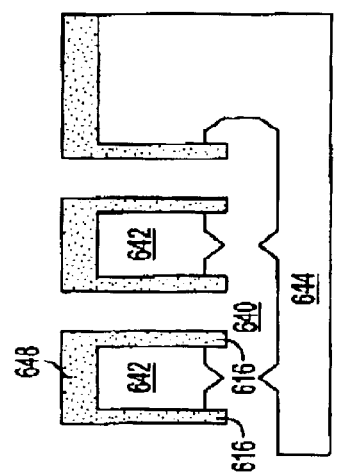
Figure 6E:
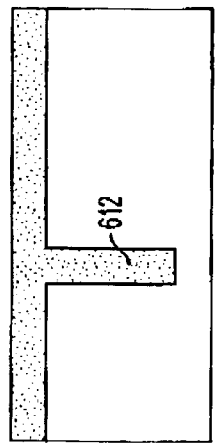
Figure 6F:
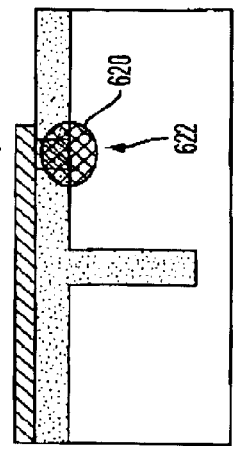
Figure 6G:
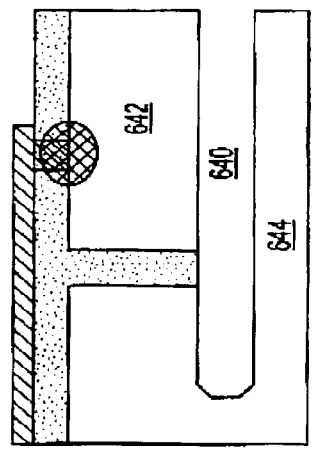

Finally, as shown in FIGS. 6c and 6g, the silicon may be etched isotropically to release 640 the beams 642 from the substrate 644. (Beam 642 may be any one of electrode fingers 116, 118, beams 332, 338, torsional flexure 120, or any other portion of movable structure 300. In some embodiments, fixed structure 400 may also be released from substrate 644, and the truss structure of f) "Tails" 646 of oxide may extend below the silicon of beams 642. These tails 646 may provide added stability in thermal expansion, because tails 646 may counter-balance any bending moment imparted by thermal expansion or contraction of the oxide 648 at the tops of the beams. In embodiments in which the release etch is carried out as a dry-etch process, stiction between adjacent structures or between structures and the substrate floor may be reduced to negligible levels, or so as to be non-existent.

Referring again to FIGS. 3 and 4, in conjunction with FIGS. 6c and 6g, in some embodiments some of the fingers 112, 114, 116, 118 may be omitted, to make easer the step of FIGS. 6c and 6g in which beams 114, 118, 332, 338, 642 are released from the substrate. On the other hand, preserving all of the electrode fingers increases the sensitivity of accelerometer 100.

Typical beams 642 generated by the plasma micromachining process are 2 μm wide, 10 to 30 μm tall, and separated from the substrate by 15 μm. Structures that are larger than 10 μm wide generally do not release from substrate 644 during the isotropic etch. Such wide structures may provide the points where the movable or fixed structures anchor to the silicon substrate.

To form large structures on the order of millimeters, typically the beams are laid out in an open cellular structure, as shown in FIG. 2. Such layouts aid in achieving higher oscillation Q's (a high Q-factor oscillator is one that oscillates consistently at the same frequency, a low Q oscillator may resonate a different frequencies depending on the impulse applied). A high oscillation Q may in turn improve precision in accelerometer 100. Since the structures formed from the plasma micromachining process are predominantly composed of stress-free, single-crystal crystal silicon, which is a well-characterized and reproducible material, the performance of the structures may be predictable and reproducible.

Processes for forming accelerometer 100, and isolation joints 160, 360, are discussed in U.S. Pat. No. 6,239,473, Adams et al., Trench Isolation Process for Microelectromechanical Devices, U.S. Pat. No. 5,719,073, Adams et al., Microstructures and Single-mask, Single-crystal Process for Fabrication Thereof, U.S. Pat. No. 5,846,849, Microstructure and Single mask, Single-crystal Process for Fabrication Thereof, U.S. Pat. No. 6,051,866, and S. G. Adams et. al., "Single-Crystal Silicon Gyroscope with Decoupled Drive and Sense," in Micromachined Devices and Components V, Patrick J. French, Eric Peeters, Editors, Proceedings of SPIE Vol. 3876, 74–83(1999), K. A. Shaw, Z. L. Zhang, and N. C. Macdonald, "SCREAM I: A single mask, single-crystal silicon process for microelectromechanical structures," Sensors and Actuators A, vol. 40, pp. 63–70, 1994, and Z. L. Zhang, N. C. MacDonald, "A rie process for submicron, silicon electromechanical structures," J. Micromech. Microeng., v2, pp. 31–38, 1992, all of which are incorporated herein by reference.

IV. Alternative Embodiments

In another embodiment, electrodes 112, 114, 116, 118 may be formed out of a thick polysilicon layer deposited on a silicon substrate wafer, with the silicon substrate serving only as a structural substrate or as shielding, and not playing an active role in sensing.

In another embodiment, electrodes 11, 114, 116, 122, 128 may be formed in multiple SOI (silicon-on-insulator) layers laid on the silicon substrate wafer.

In another embodiment, electrodes 112, 114, 116, 118, 122, 128 may be formed in multiple metal layers laid on the silicon, with the silicon serving only as a structural substrate or as shielding, and not playing an active role in sensing.

Figure 7:
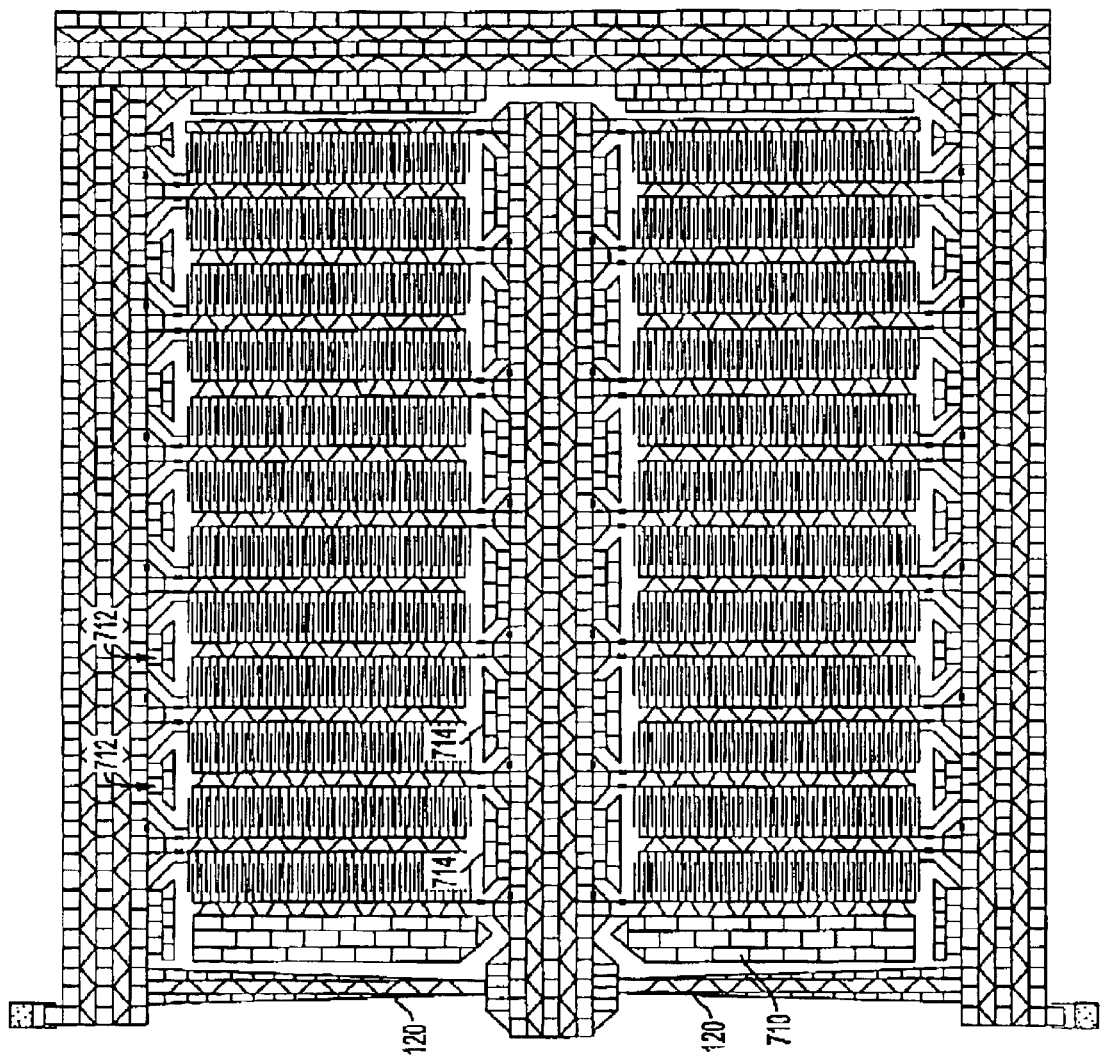
FIG. 7 is a plan view of an accelerometer.

Referring to FIG. 7, torsional flexure 120 may be reconfigured to reduce motion in directions other than the z-axis 130 (up and down out of the paper) while preserving compliance for z-axis motion. For instance, torsional flexure 120 may configured in a more triangular shape, to maintain good torsional compliance—and freedom of movement of movable portion 300 along the z-axis—while maintaining good stiffness in other directions and resistance to other vibrational modes.

Referring again to FIG. 7, additional structures 710, 712, 714 may be incorporated to maintain a relatively uniform density of structure, to improve the uniformity with which the fabrication steps operate. In alternative embodiments, the spacing between some elements may be increased, to ease the release step (see FIGS. 6c and 6g).

The placement of electrodes 112, 114, 116, 118 may be arranged to reduce temperature-sensitive curvature of the device that may result from fabrication.

The internal truss structure of movable portion 300 and fixed portion 400 may be configured to improve rigidity.

In the embodiment shown in FIG. 2, movable portion 300 is arranged as a "diving board," cantilevered toward a single side of anchor point 206. In other embodiments, movable electrodes 116, 118 may be arranged as a "teeter totter," arranged bilaterally about a central resilient mounting. In other cases, electrodes 112, 116 may be formed on one side, and electrodes 114, 118 on the other. In other cases, movable electrodes 116, 118 may be arranged on one side of anchor point 206, and a dummy mass may extend from the other side of anchor point 206. The two sides of the teeter totter will generally have different rotational moments about the resilient mounting, so that acceleration will induce rotation.

It should be understood that all dimensions, electrical values, geometrical aspects, fabrication technologies, etc. describe only some example embodiments as they may be preferred in 2000–01. As new fabrication technologies emerge, these values may change.

For the convenience of the reader, the above description has focused on a representative sample of all possible embodiments, a sample that teaches the principles of the invention and conveys the best mode contemplated for carrying it out. The description has not attempted to exhaustively enumerate all possible variations. Further undescribed alternative embodiments are possible. It will be appreciated that many of those undescribed embodiments are within the literal scope of the following claims, and others are equivalent.

We claim:
1. An accelerometer, comprising:
a monocrystalline silicon wafer etched to form a fixed portion, a movable portion, and a resilient coupling between, the fixed and movable portions generally arranged in the plane of the wafer;
one of the fixed and moveable portions including a first electrode, the other of the fixed cod moveable portions including a second electrode, the other of the fixed and moveable portions comprising an electrically conductive layer mechanically coupled with the second electrode and electrically connected as a third electrode, the second and third electrodes being stacked ins direction parallel to an axis of acceleration and arranged in capacitive opposition to the first electrode;

a resilient coupling designed to retain the first and third electrodes in capacitive opposition to each other across a capacitance gap while allowing motion of the first electrode relative to the second and third electrodes in response to acceleration along an axis of acceleration perpendicular to the plane of the wafer, and to resiliently restore the first electrode to an equilibrium position relative to the second and third electrodes when the acceleration ceases, the first and second electrodes being arranged in direct capacitive opposition and the first and third electrodes being arranged in indirect capacitive opposition, the capacitance between the first electrode and third electrode increasing as the movable portion moves away from the equilibrium position in a direction along the axis of acceleration and decreasing as the movable portion moves in an opposite direction away from the equilibrium position; and electronics and/or software designed to translate a measurement of capacitance between the first and third electrodes into a measurement of acceleration along the axis of acceleration.

2. An accelerometer, comprising:

a first structure and a second structure, the first and second structures generally arranged in a plane, the first structure comprising a first electrode, the second structure comprising a second and third electrodes, the second and third electrodes being mechanically coupled and stacked in a direction parallel to an axis of acceleration perpendicular to the plane and arranged in capacitive opposition to the first electrode, wherein the first and second electrodes are arranged in direct capacitive opposition and the first and third electrodes are arranged in indirect opposition;

a resilient coupling designed to retain the first and second structures in capacitive opposition to each other across a capacitance gap while allowing motion of the second and third electrodes relative to the first electrode in response to acceleration along the axis of acceleration, and to resiliently restore the electrodes to an equilibrium position when the acceleration ceases; and electronics and/or software designed to translate a measurement of capacitance between the first and third electrodes into a measurement of the acceleration along the axis.

3. The accelerometer of claim 2, wherein the first structure, second structure and resilient coupling are formed primarily of silicon.

4. The accelerometer of claim 3, wherein the first structure and second structure are formed at least primarily of high aspect ratio beams each having a larger cross-sectional dimension thereof oriented parallel to the axis of acceleration.

5. The accelerometer of claim 3, wherein the first and second electrodes are formed of silicon, and the third electrode is formed as a metal layer on the second structure.

6. The accelerometer of claim 5, wherein the second electrode is connected to a ground potential.

7. The accelerometer of claim 5, wherein the first structure is formed as a high-aspect-ratio beam with a larger cross-sectional dimension of the beam oriented parallel to the axis of acceleration.

8. The accelerometer of claim 3, wherein:

a silicon wafer is etched to form the first structure and the second structure.

9. The accelerometer of claim 8, wherein:

various portions of the second and first structures are electrically isolated from each other by isolation joints formed within the silicon wafer.

10. The accelerometer of claim 8, wherein:

various structures etched from the wafer are released from an underlying substrate of the silicon wafer.

11. The accelerometer of claim 2, wherein:

the electronics and/or software measure differential capacitance between at least two pairs of electrodes, and translate the measured differential capacitance into an expression of acceleration.

12. The accelerometer of claim 2, wherein:

a capacitance between the first and third electrode is at a maximum when the third electrode is displaced from the equilibrium position.

13. The accelerometer of claim 2, wherein:

the resilient coupling is a torsional flexure.

14. The accelerometer of claim 8, wherein:

the resilient coupling is integrally etched from the silicon wafer with the first and second structures.

15. The accelerometer of claim 2, further comprising:

first, second, and third electrodes arranged in first and second regions, such that motion in a direction perpendicular to the plane results in increased capacitance between electrodes in the first region and decreased capacitance in the second region; and motion in an opposite direction results in decreased capacitance between electrodes in the first region and increased capacitance in the second region.

16. The accelerometer of claim 2, wherein the mass of the movable structure is concentrated on one side of the resilient coupling.

17. A method, comprising the steps of:

applying an acceleration to a fixed structure and a movable structure, the fixed and movable structures generally arranged in a plane perpendicular to an axis of the acceleration, the fixed structure comprising a fixed electrode, the movable structure comprising a movable electrode and a shield electrode, the movable and shield electrodes being mechanically coupled and stacked in a direction parallel to the axis of acceleration and arranged in capacitive opposition to the fixed electrode, wherein the fixed and shield electrodes are arranged in direct capacitive opposition and the fixed and movable electrodes are arranged in indirect opposition;

in response to the acceleration, allowing motion of the movable electrode relative to the fixed electrode, a resilient coupling retaining the fixed and movable electrodes in capacitive opposition to each other across a capacitance gap;

resiliently restoring the fixed and movable electrodes to an equilibrium position when the acceleration ceases; and measuring capacitance between the movable and fixed electrodes, and translating the measured capacitance into an expression of the acceleration.

18. The method of claim 17, wherein:

the fixed and shield electrodes are formed of silicon, and the moveable electrode is formed as an electrically-conductive layer deposited on the movable structure.

19. The method of claim 17, wherein;

electrodes of movable and fixed structures of the accelerometer are arranged in first and second regions, such that motion in a direction of the movable structure results in increased capacitance between electrodes in the first region and decreased capacitance in the second region; and motion in an opposite direction of the movable structure results in decreased capacitance between electrodes in the first region and increased capacitance in the second region.

20. The method of claim 17, wherein:

the resilient coupling is a torsional flexure.

21. An accelerometer, comprising:

a fixed portion and a movable portion, the fixed and movable portions generally arranged in a plane;

a resilient coupling designed to allow motion of the movable portion relative to the fixed portion in response to acceleration along an axis of acceleration perpendicular to the plane and to resiliently restore the fixed and movable portions to an equilibrium position when the acceleration ceases;

one of the fixed and moveable portions being electrically connected as a first electrode, the other of the fixed and moveable portions comprising an electrically-conductive layer electrically connected as a second electrode, the first and second electrodes being arranged in capacitive opposition to each other;

electronics and/or software designed to translate a measurement of capacitance between the first and second electrodes into a measurement of acceleration along the axis.

22. The accelerometer of claim 21:

wherein a silicon wafer is etched to form the fixed portion and the movable portion.

23. The accelerometer of claim 22, wherein:

the mass of the movable portion is concentrated on one side of the resilient coupling.

24. The accelerometer of claim 22, wherein:

the resilient coupling is integrally etched from the silicon wafer with the fixed and movable portions.

25. The accelerometer of claim 22, wherein:

a substantial portion of the movable portion is manufactured by a process including a step of releasing the movable portion from an underlying substrate of the wafer.

26. The accelerometer of claim 22, wherein:

various portions of the movable and fixed portions are electrically isolated from each other by isolation joints formed within the silicon wafer.

27. The accelerometer of claim 22, wherein:

wherein the second electrode is formed as a layer mechanically coupled with and electrically isolated from the movable portion.

28. The accelerometer of claim 21, wherein:

the resilient coupling is formed from a solid of high modulus of elasticity.

29. The accelerometer of claim 21, wherein:

the resilient coupling is a torsional flexure.

30. The accelerometer of claim 21, wherein:

the movable portion includes a Stop designed to engage a floor of the fixed portion to limit excess motion.

31. The accelerometer of claim 21, wherein:

electrodes of the movable and fixed portions are arranged in first and second regions, such that:

motion in a direction of the movable portion results in increased capacitance between electrodes in the first region and decreased capacitance in the second region; and motion in an opposite direction of the movable portion results in decreased capacitance between electrodes in the first region and increased capacitance in the second region.

32. The accelerometer of claim 21, wherein:

the capacitance between the first electrode and second electrode increases as the movable portion moves away from the equilibrium position in a direction along the axis of acceleration and decreases as the movable portion moves in an opposite direction.

33. A method, comprising the steps of:

establishing an electric field between a movable electrode and a fixed electrode of an accelerometer, the movable and fixed electrodes being arranged in capacitive opposition to each other, one of the fixed and moveable electrodes being formed of silicon, the other of the fixed and moveable electrodes being formed as an electrically-conductive layer mechanically coupled with and electrically isolated from a silicon structure and stacked with the silicon structure in a direction of an axis of acceleration, allowing motion of the movable electrode relative to the fixed electrode in response to an acceleration along the axis of acceleration, and allowing a resilient coupling to restore the fixed and movable electrodes to an equilibrium position when the acceleration ceases;

measuring capacitance between the movable and fixed electrodes, and translating the measured capacitance into an expression of the acceleration.

34. The method of claim 33, wherein:

the electrode formed of silicon is a first silicon electrode; and the silicon structure on which the conductive-layer electrode is formed is electrically connected as a second silicon electrode, the conductive-layer electrode and second silicon electrode being arranged in capacitive opposition to the first silicon electrode, the second silicon electrode being in opposition to a majority of the surface area of the first silicon electrode when the electrodes are in the equilibrium position.

35. The method of claim 33, wherein:

the silicon structure and one of the fixed and movable electrodes of the accelerometer are formed by etching a silicon wafer.

36. The method of claim 35, wherein:

the resilient coupling is integrally etched from the silicon wafer.

37. An accelerometer, comprising:

a silicon wafer etched to form a fixed portion, a movable portion, and a resilient coupling between, the fixed and movable portions generally arranged in a plane, the resilient coupling designed to allow motion of movable portion relative to the fixed portion perpendicular to the wafer in response to acceleration perpendicular to the wafer and to resiliently restore the fixed and movable portions to an equilibrium position when the acceleration ceases, the mass of the movable portion being concentrated on one side of the resilient coupling;

the fixed portion comprising a fixed electrode and the moveable portion comprising a movable electrode, the electrodes being arranged in indirect capacitive opposition; and electronics and/or software designed to translate a measurement of capacitance between the first and second electrodes into a measurement of acceleration perpendicular to the wafer.

38. The accelerometer of claim 37, further comprising:
a third electrode mechanically coupled to the movable electrode, the movable electrode and third electrode being arranged in capacitive opposition to the fixed electrode, the third electrode being in direct capacitive opposition to a majority of the surface area of the fixed electrode when the fixed electrode and movable electrode are in the equilibrium position.

39. The accelerometer of claim 37, wherein:
the silicon wafer is etched by a dry-etch process to form the fixed portion and the movable portion.

40. The accelerometer of claim 37, wherein:
electrodes of the movable and fixed portions are arranged in first and second regions, such that:
motion in a direction of the movable portion results in increased capacitance between electrodes in the first region and decreased capacitance in the second region; and
motion in an opposite direction of the movable portion results in decreased capacitance between electrodes in the first region and increased capacitance in the second region.

41. The accelerometer of claim 37, wherein:
the resilient coupling is integrally etched from the silicon wafer with the fixed and movable portions.

42. The accelerometer of claim 37, wherein:
the resilient coupling is formed from a solid of high modulus of elasticity.

43. The accelerometer of claim 37, wherein:
the resilient coupling is a torsional flexure.

44. The accelerometer of claim 37, wherein:
the movable portion includes a stop designed to engage a floor of the fixed portion to limit excess motion.

45. The accelerometer of claim 37, wherein:
a substantial portion of the movable portion is manufactured by a process including a step of releasing the movable portion from an underlying substrate of the wafer.

46. A method of detecting acceleration along an axis of acceleration, comprising the steps of:
establishing an electric field between a movable electrode and a fixed electrode of an accelerometer, the movable and fixed electrodes being arranged in capacitive opposition to each other and being mechanically borne on movable and fixed portions, respectively, of a structure etched from a silicon wafer, the fixed and movable portions generally arranged in a plane,
allowing motion perpendicular to the wafer of the movable electrode relative to the fixed electrode in response to an acceleration perpendicular to the wafer, and allowing a resilient coupling to restore the fixed and movable electrodes to an equilibrium position when the acceleration ceases, the mass of the movable portion being concentrated on one side of the resilient coupling; and
measuring capacitance between the movable and fixed electrodes, and translating the measured capacitance into an expression of the acceleration.

47. The accelerometer of claim 46, wherein:
excess motion of the movable portion is limited by urging a stop against a floor of the fixed portion, the stop being cantilevered on an opposing side of the mass concentration relative to the resilient coupling.

48. The accelerometer of claim 46, wherein:
the capacitance between the fixed electrode and movable electrode increases as the movable pardon moves away from the equilibrium position in a direction along the axis of acceleration and decreases as the movable portion moves in an opposite direction.

49. The accelerometer of claim 48, wherein:
the capacitance between the fixed electrode and the movable electrode reaches a maximum when the movable portion has moved from the equilibrium position by a distance of about half the depth of the fixed portion.

50. An accelerometer, comprising:
first, second and third electrodes, second and third electrodes being arranged in capacitive opposition to the first electrode across a capacitance gap;
a resilient coupling designed to allow motion of the first electrode relative to the second and third electrodes along the axis of acceleration in response to acceleration and to resiliently restore the first electrode to an equilibrium position when the acceleration ceases, the second electrode being in opposition to a majority of the surface area of the first electrode when the first, second, and third electrodes are in the equilibrium position; and
electronics and/or software designed to tram late a measurement of capacitance between the first and third electrodes into a measurement of acceleration along the axis.

51. The accelerometer of claim 50:
wherein a silicon wafer is etched to form the first and second electrodes; and
the axis of acceleration is perpendicular to the wafer.

52. The accelerometer of claim 51, wherein the third electrode is formed as an electrically-conductive layer mechanically coupled to the silicon wafer etched to form the second electrode.

53. The accelerometer of claim 51, wherein:
the capacitance between the first electrode and third electrode increases as the movable portion moves away from the equilibrium position in a direction along the axis of acceleration and decreases as the movable portion moves in an opposite direction.

54. The accelerometer of claim 51, wherein:
the third electrode is formed as a layer of electrically-conductive material that is mechanically coupled with and electrically isolated from the silicon wafer etched to form the movable portion.

55. The accelerometer of claim 51, wherein:
various structures etched from the wafer are electrically isolated horn each other by isolation joints formed within the silicon wafer.

56. The accelerometer of claim 51, wherein:
various structures etched from the wafer are released from an underlying substrate of the silicon wafer.

57. The accelerometer of claim 50, wherein:
the second electrode is electrically connected to consume field lines from the capacitance gap.

58. A method, comprising the steps of:
establishing an electric field between first, second and third electrodes of an accelerometer, the second and third electrodes being arranged in capacitive opposition to the first electrode, the first, second and third electrodes being mechanically borne on movable and fixed portions of an accelerometer;
allowing motion, perpendicular to the plane generally containing the second and third electrodes, of the movable portion relative to the fixed portion in response to an acceleration, and allowing a resilient coupling to restore the first, second, and third electrodes to an equilibrium position when the acceleration ceases, the second electrode being in opposition to a majority of the surface area of the first electrode when the first, second, and third electrodes are in the equilibrium position; and measuring capacitance between the first and third electrodes, and translating the measured capacitance into an expression of the acceleration.

59. The method of claim 58, wherein:

the fixed portion and the movable portion are etched from a silicon wafer.

60. The method of claim 59, wherein:

the first and second electrodes are etched out of silicon.

61. The method of claim 60, wherein:

the third electrode is formed as a layer of electrically-conductive material that is mechanically coupled with and electrically isolated from the silicon etched to form the movable portion.

62. The method of claim 61, wherein:

the first and third electrodes are arranged relative to each other so that motion of the movable portion away from the equilibrium position in one direction increases capacitance between the first and third electrodes, and motion in an opposite direction from the equilibrium position decreases capacitance between the first and third electrodes.

63. The method of claim 58, further comprising the steps of:

measuring differential capacitance between at least two pairs of electrodes; and translating the measured differential capacitance into an expression of acceleration.

64. The method of claim 58, wherein:

the mass of the movable portion is concentrated on one side of the resilient coupling.

* * * * *